United States Patent [19]
Torre et al.

[11] Patent Number: 5,040,748
[45] Date of Patent: Aug. 20, 1991

[54] PAYLOAD ADAPTER RING

[75] Inventors: Christopher N. Torre, Summerland; Jeffrey D. Holdridge, San Diego, both of Calif.

[73] Assignee: General Dynamics Corporation/Space Systems Division, San Diego, Calif.

[21] Appl. No.: 481,918

[22] Filed: Feb. 20, 1990

[51] Int. Cl.[5] .............................................. B64G 1/64
[52] U.S. Cl. ................................ 244/158 R; 244/161; 244/137.1; 244/137.4
[58] Field of Search ................ 244/158 R, 161, 118.1, 244/160, 137.1, 137.4

[56]  References Cited
U.S. PATENT DOCUMENTS 3,907,225  9/1975  Welther ........................... 244/158 R
4,554,905  11/1985  Smyly et al. ................ 244/158 R X
4,860,974  8/1989  Barnett et al. ................... 244/158 R

FOREIGN PATENT DOCUMENTS 2002307  2/1979  United Kingdom ................ 244/158

Primary Examiner—Joseph F. Peters, Jr.
Assistant Examiner—Carla Mattix
Attorney, Agent, or Firm—John R. Duncan; Frank D. Gilliam; Geoerge T. Parsons

[57]  ABSTRACT

A payload interface ring adapted to releasably secure a payload to a multiple payload adapter arranged to be carried into outer space by a launch vehicle for positioning of the payload in a suitable orbit relative to the earth. The interface ring includes a latching mechanism secured to a base to receive a berthing pin carried by the payload and to releasably latch the berthing pin for securing of the payload for transport of the payload to a desired orbit. A plurality of springs cooperate with the berthing pins and the latching mechamism to secure the payload in a desired latched position during transport to the desired orbit. An electrical solenoid cooperates with the biasing springs and the latching mechanism to simultaneously unlatch the latching mechanisms to free the berthing pins and actuate a spring loaded actuator whereby the payload previously secured as to the payload interface ring is released from the interface ring and the spring loaded actuator forcibly separates the payload from the interface ring.

11 Claims, 2 Drawing Sheets

PAYLOAD ADAPTER RING

BACKGROUND OF THE INVENTION

1. Field of the Invention

This invention relates generally to the field of space vehicles and more particularly, but not by way of limitation, to an improvement in spacecraft for inserting a payload into a selected space flight path in a selected altitude relative to the earth.

2. Prior Art

In many space program applications, it is desirable to secure a payload in the cargo bay of a space vehicle to perform certain programs in space. It is desirable to provide a system for securing a wide range of payload sizes and shapes which may range upwards to several tons and require large volumes.

Several payload attach methods have been proposed for utilization in the space program for securing payloads to space vehicles. However, most of these have involved very complex and heavy arrangements which utilize a large number of moving parts involving hinged linkages and arm assemblies for gripping the payload. In such arrangements the reliability is adversely affected by the large number of moving parts and the complexity of the systems. In addition, the cost is very high due to the complicated arrangements and the redundancy which is required due to the necessity of having motors to drive the numerous linkages and gripping arms. A backup motor is required in case a primary motor fails.

Other methods utilize rigidly supported payloads using bolted joints. In order to separate these payloads, pyrotechnic systems are used for detachment. This method is not reuseable and would not be able to provide for re-attaching payloads in space.

In addition, it may be desirable to carry multiple space payloads, such as communications or surveillance satellites, interplanetary probes or the like, mounted on a suitable carrier for selectively positioning each space payload in a desired orbit about the earth. Such space payloads could be mounted onto either a ground integrated multiple payload carrier or a space integrated multiple payload carrier for simultaneous orbital delivery of multiple payloads, or be mounted directly to the delivery vehicle for single payload delivery. The wide disparity of payload weights and sizes to be delivered by a launch vehicle makes it desirable to have one common mechanical interface to releasably secure the payload to the particular multiple payload adapter chosen for a particular mission. The device of the present invention is intended to provide such a modular common mechanical interface.

U.S. Pat. Nos. 3,907,225 and 3,652,042 disclose spacecraft for deploying objects into selected flight paths in space. The spacecraft in each instance provides a carrier ring that is carried by a launch vehicle into space for deployment of the payloads 12. The carrier rings are provided with interfaces which provide one or four points of support for a payload.

U.S. Pat. No. 3,547,375 discloses a passive release mechanism for release of a space vehicle. This mechanism discloses a pedestal which is provided with a plurality of ball-lock pins for securing a payload on the pedestal. When it is desired to separate the payload from the carrier the lock-pins are withdrawn into the pedestal and the pedestal itself is lowered away from the payload. The carrier and the pedestal are then removed from the payload to passively release the payload into a desired position in space.

U.S. Pat. No. 3,174,706 discloses a separation device for retention of a pair of components in axial engagement and for release of the components responsive to a signal. A satellite and a space vehicle are provided with mating flanges that are separably clamped by a plurality of clamps. In response to the detonation of certain squibs, the clamps are moved outwardly to free the satellite and a spring loaded plunger propels the satellite away from the space vehicle.

U.S. Pat. No. 4,508,296 discloses a hemispherical latching apparatus for retaining a payload within the cargo bay of a space shuttle. The apparatus provides a plurality of complimentary spherical latching elements which automatically align and engage with one another when the payload is moved into a docked payload position in the bay. An electric motor withdraws a locking pin from each latching element to permit the payload to be gimballed from the cargo bay of the space shuttle for placement in a desired position.

While the above noted patents are of general interest in the field to which the invention pertains they do not disclose the particular aspects of the invention that are of significant interest. In particular, none of the noted patents disclose a modular payload adapter ring adapted to provide a mounting pattern for a wide disparity of payload weights and sizes. Nor do they disclose a simple mechanical interface that forcibly separates a payload from a carrier ring without the use of explosive squibs.

SUMMARY OF THE INVENTION

In accordance with the present invention, there is provided a payload interface ring adapted to releasably secure a payload to a multiple payload carrier arranged to be carried into outer space by a launch vehicle or transfer vehicle for positioning of the payload in a suitable orbit relative to the earth. The payload interface ring comprises a hollow annular base secured to the adapter and a latching mechanism to receive berthing pins carried by the payload and to releasably latch such pins for securing of the payload for transport of the payload to a desired orbit. Biasing means cooperate with the berthing pins and the latching means to secure the payload in a desired latched position during transport into space. Means cooperate with the biasing means and the latching means to simultaneously unlatch the latching means to free the berthing pins and actuate the biasing means whereby the payload previously secured to the payload interface ring is released from the interface ring and the biasing means forcibly separates the payload from the interface ring.

Other features and attendant advantages of the present invention will become apparent to those skilled in the art from a reading of the following detailed description constructed in accordance with the accompanying drawings and wherein:

DESCRIPTION OF THE PREFERRED EMBODIMENT

Figure 1:
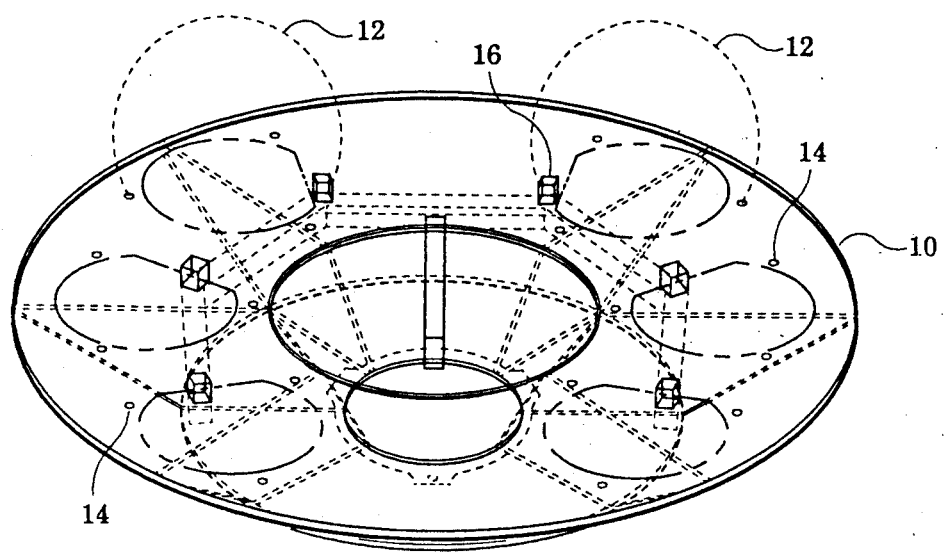
FIG. 1 is a diagrammatic perspective of a multiple payload carrier adapted to receive the payload interface ring of the present invention for transporting and positioning a payload in space.

Referring to the drawings in detail and in particular to FIG. 1, the reference character 10 generally designates a multiple payload adapter, generally frustro-conical in shape, which is adapted to carry a plurality of space payloads 12 designated in dotted outline. The payload adapter ring of the present invention is intended to releasably secure such payloads 12 to the carrier ring for transport into outer space for positioning therein as may be desired. The carrier 10 may comprise a ground integrated multiple payload carrier or a space integrated multiple payload carrier for simultaneous orbital delivery of multiple payloads or directly to the transportation vehicle for single payload delivery. The carrier 10 is shown for illustrative purposes to be prepared to transport six payloads 12, is provided with three interface points 14 for each adaptor ring for securing it thereon.

Each payload 12 is provided with suitable electrical and mechanical attach connections since the ring is provided with an electrical connection interface 16 for each payload position.

Figure 2:
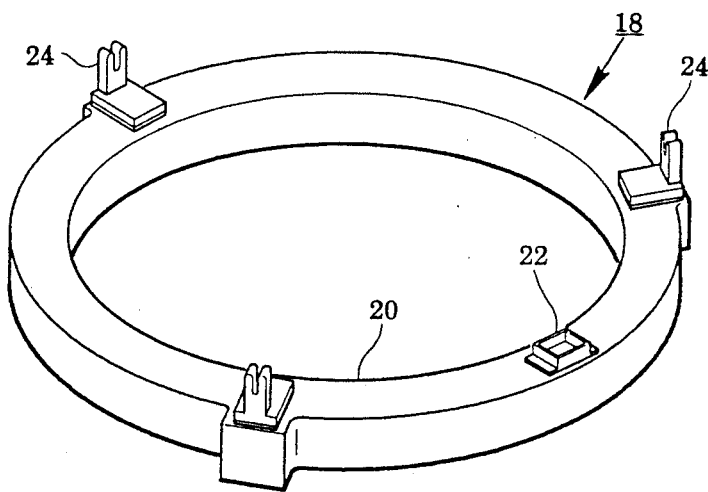
FIG. 2 is a simplified perspective of a payload adapter ring constructed in accordance with the principles of the present invention.

The payload adapter ring 18 of the present invention is seen in perspective in FIG. 2 where it is seen to have a base structure 20 that is generally annular in shape and having a hollow box structure. The box structure is preferably a graphite/epoxy T300/934 ply lay up. The ring 18 is provided with an electrical umbilical connection 22 for connection to an electrical connection interface 16 of the carrier 10. The electrical connection 22 is to provide electrical power to the payload 12 prior to separation in a manner well known in the art.

Figure 4:
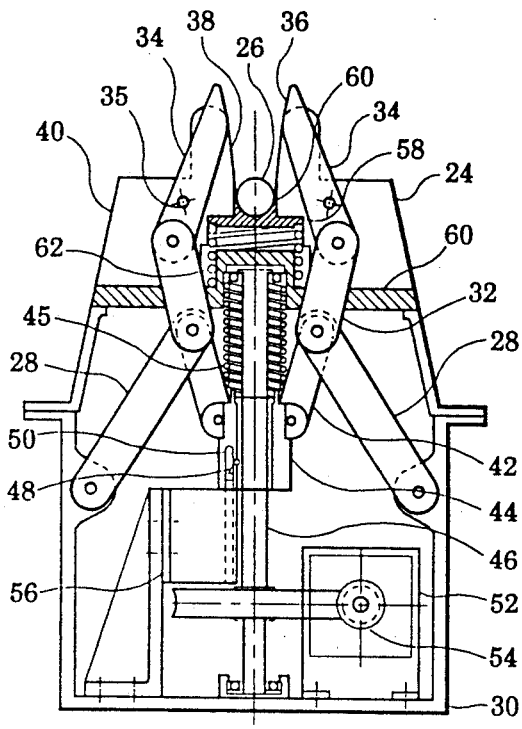
FIG. 4 is a simplified section of the latching portion of the payload adapter ring shown in an open position to receive the berthing pin of a payload.
Figure 5:
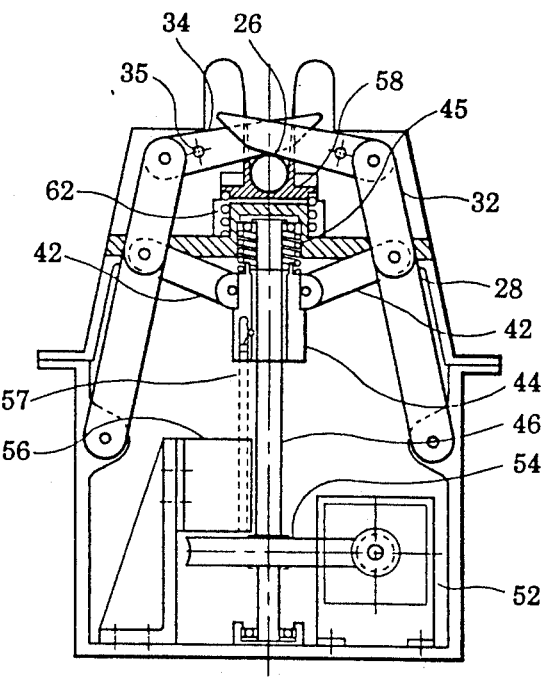
FIG. 5 is a simplified section of the latching mechanisms of the interface ring shown in a closed position to secure a payload for transport into space.
Figure 6:
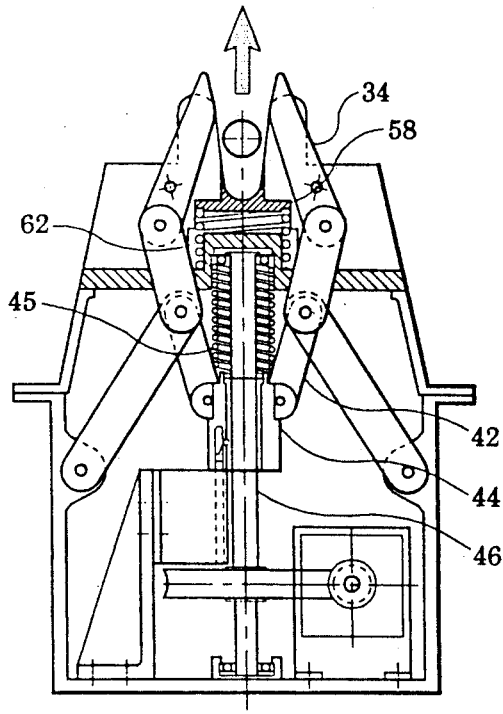
FIG. 6 is a simplified section of the latching mechanism of the interface ring illustrating the latching mechanism having been driven to an open position to release the latched berthing pin and to forcibly separate the payload from the ring.

The payload adapter ring 18 is provided with a latching mechanism 24 which is shown generally in FIG. 2 and shown in greater detail in FIGS. 4–6. The ring 18 is preferably provided with three latching mechanisms 24 that are spaced at 120 degree clocked positions.

Figure 3:
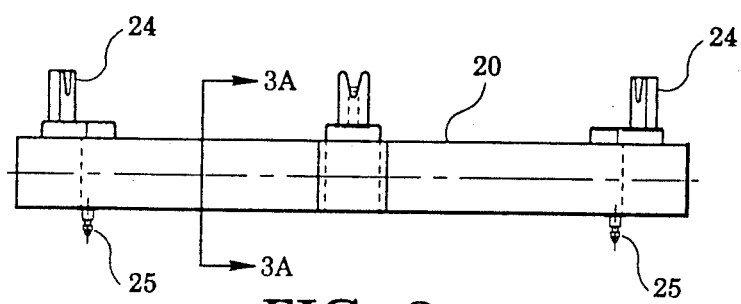
FIG. 3 is an end view of the payload interface ring shown in FIG. 2 and illustrating the connections for the interface ring to the carrier ring.
Figure 3A:
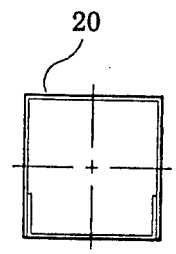
FIG. 3A is a section taken along lines 3A—3A in FIG. 3.

Referring now to FIG. 3, the payload adapter ring 18 is illustrated in an end view which shows the retention pins 25 which are adapted to secure the ring 18 to the carrier ring 10 at points 14. FIG. 3A shows the hollow box construction of the base structure 20 which is intended to provide a high strength to weight ratio for a space application.

In FIGS. 4–6 the details of the latching mechanism 24 are shown. A latching mechanism 24 is secured to the base 20 to receive a berthing pin 26, shown in outline, carried by the payload 12 to releasably latch the berthing pin 26 for securing of the payload 12 for transport of the payload 12 to a desired orbit. In the illustrated embodiment of the invention this latching mechanism means 24 includes a link mechanism that receives the berthing pin 26 in an open position and which latches the berthing pin 26 in a locked position. In the open position shown in FIG. 4, the link mechanism includes a pair of link members that are journalled at their lower ends to a hollow housing 30. Each link member 28 is journalled at its upper end to a second link member 32 that in turn is journalled to a third link member 34 that cooperates with a complementary link member 34 to provide a latching cooperation to secure the berthing pin 26. As seen in FIG. 4, when the jaw links 34 are in an open position to receive the berthing pin 26 the inclined surfaces 36 provided on the jaw links 34 and the inclined surfaces 38 of the stationary structure 40 of the latching mechanism 24 assist in guiding the berthing pin 26 to a at rest position.

Link members 28 and 32 are journalled to a drive link 42 that in turn is journalled to a drive sleeve 44. The drive sleeve 44 surrounds and is drivingly coupled to a central drive shaft 46 by means of selectively disengageable ball 48 that is carried within a longitudinally extending bore 50. A spring 45 surrounds the shaft 46 above the sleeve 44. The drive sleeve 44 is secured from rotational movement with the drive shaft 46 by a suitable splined arrangement (not shown). The drive shaft 46 is driven by a suitable electric motor, such as a 28 VDC motor 52, that is drivingly connected to the drive shaft 46 through a suitable worm gear reduction drive 54.

A solenoid arrangement 56 is also provided in the housing 30 and cooperates with the drive sleeve 44 in a manner that will be described in more detail hereinafter.

An actuating member 58 is positioned above an intermediate member 60 of the structure 40 and is configured at its upper portion 60 to receive a berthing pin 26. The actuator 58 is provided with a spring means 62 that is interposed between the actuator 58 and the intermediate member 60. In the open position of the latching mechanism 24 shown in FIG. 1 the spring means 62 is unloaded by any pressure from the associated actuator 58.

Looking now to FIG. 5, an illustration is seen of the latching mechanism 18 in a closed position in which the jaw links 34 latch an associated berthing pin 26 in a locked position. After a berthing pin 26 has been positioned on the upper portion of the actuator 58 as seen in FIG. 4 the electric motor drive means 52 drives the associated gear reduction drive 54 which is fixedly connected to the drive shaft 46 to rotate it. Rotation of the drive shaft 46 drives the coupled drive sleeve 44 upwardly. As the drive sleeve 44 is driven upwardly the drive links 42 are in turn driven from a generally vertical direction to a generally horizontal direction. As the drive links 42 are driven to a generally horizontal direction they cooperated with associated link members 28 and 32 to drive the jaw links 34 about their pivots 35 inwardly to generally horizontal overlapping position to lock the berthing pin 26 against the upper portion of the actuator 58.

As the jaw links 34 close over the berthing pin 26 they are driven further to drive the actuator 58 downwardly to compress the biasing spring 62. Thus, in the closed position of the payload adapter ring 18 the jaw links 34 have been closed over the berthing pin 26 to lock it to the ring 18, the actuator 58 has been driven downwardly to bias the spring 62 so that it provides an upward biasing force on the actuator 58 that is restrained from movement by the closed jaw links 34, and the drive sleeve 44 has been driven upwardly to a position to compress the drive sleeve spring 45 so that it biases the drive sleeve 44 downwardly. The spring 45 is precluded from driving the sleeve 44 downwardly by the connection of the ball 48 to the ball drive shaft 46.

When the carrier ring 10 has been transported by a launch vehicle into space and it is desired to separate a payload 12 into a desired position in space, the solenoid means 56 is actuated to drive an associated plunger 57, shown in dotted outline in FIG. 5, upwardly into the aligned bore 50 in the drive sleeve 44 to decouple the locking ball 48 from locking engagement with the ball screw drive shaft 46. The solenoid means 56 is only energized long enough for the plunger 57 to disengage the ball 48 from the ball drive screw shaft 46.

Referring now to FIG. 6, it will be seen that when the ball 48 is freed from locking engagement with the shaft 46 the compressed biasing spring 45, since the drive sleeve 44 is free to move on the shaft 46, drives the sleeve 44 downwardly. As the sleeve 44 is driven downwardly upon its release it causes the drive links 32 to sharply rotate upwardly and drive, through the associated links, the jaw links 34 to an open unlocked position. As the jaw links 34 are opened, the compressed ejection spring 62 is permitted to bias the plunger 58 upwardly to forcibly separate the berthing pin 26 from the payload adapter ring 18. Thus, it will be seen that in response to a common command to each latching mechanism 24 of the ring 18 the latching mechanisms 24 act simultaneously to unlatch the berthing pins 26 of the space payload 12 and to forcibly separate it from the ring 18.

Thus, it is seen that the present invention provides a simple modular payload adapter ring that may be used to releasably secure a space payload to a carrier ring for transport and positioning in outer space. The ring of the instant invention can be used to deliver a wide disparity of payload weights and sizes into orbit.

Although the present invention has been shown and described with reference to a particular embodiment, nevertheless, various changes and modifications obvious to one skilled in the art to which the invention pertains are deemed within the purview of the invention.

What is claimed is:

1. A payload adapter ring adapted to releasably secure a payload to a multiple payload adapter arranged to be carried into outer space by a launch vehicle or be carried in orbit by orbital transfer vehicles for positioning of the payload in a suitable orbit relative to the earth and comprising:

a base adapted to be secured to the carrier ring;

latching means comprising a link mechanism that is adapted in an open position to receive the berthing pins of a payload and in a closed position to lock the berthing pins in a secured position for transport of the payload to a desired orbit secured to the base to receive a berthing pin carried by the payload and to releasably latch said berthing pin for securing of the payload for transport of the payload to a desired orbit;

drive means to drive the link mechanism from an open position to a closed latching position, said drive means includes a rotatable central drive shaft having a biased drive sleeve selectively coupled to it with the link mechanism being coupled to the drive sleeve so that when the drive sleeve is driven from a rest position to a predetermined position the link mechanism is driven to a closed latching position to secure said berthing pins;

biasing means cooperating with the berthing pins and the latching means to secure the payload in a desired latched position during transport to the desired orbit; and unlatching means comprising means to selectively uncouple the biased drive sleeve from the central drive shaft to permit said biased drive sleeve to be returned to its original rest position and simultaneously cause the coupled link mechanism to be driven from a closed latching position to an open position, said unlatching means cooperating with the biasing means and the latching means to simultaneously unlatch the latching means to free the berthing pins and actuate the biasing means whereby the payload previously secured to the payload interface ring is released from the interface ring and the biasing means forcibly separates the payload from the interface ring.

2. A payload adapter ring according to claim 1 wherein:

the unlocking mechanism includes an electrical solenoid having an associated plunger that upon energization of the solenoid is driven to a position of cooperation with the biased drive sleeve to uncouple it from the drive shaft and permit it to be biased to return to its open position.

3. A payload adapter ring according to claim 2 wherein:

said drive means includes an electric motor coupled to the drive shaft through a gear reduction drive with the drive sleeve being biased to a normally open position and being releasably coupled to the drive shaft through a ball connection that may be decoupled from drivable engagement with the drive shaft by a plunger of the electrical solenoid.

4. A payload adapter ring according to claim 3 wherein:

said drive sleeve is biased to a normally open position by a spring means which surrounds the central drive shaft and which is compressed as the drive sleeve is driven to a latching position and that upon release of such compression when the drive sleeve is decoupled from the drive shaft serves to immediately bias the drive sleeve to its original open position.

5. A payload adapter ring according to claim 4 wherein:

said biasing means cooperating with a berthing pin comprises a biased plunger having an upper portion configured to receive a berthing pin and to permit jaws of the latching mechanism to close upon the berthing pin to latch it in a secured position.

6. A payload adapter ring according to claim 5 wherein:

said biasing means cooperating with a berthing pin includes a spring means which biases the associated actuator to an open receiving position and that is compressed as the jaws of the latching mechanism closes on a berthing pin of a payload and which upon the abrupt release of such spring means by the unlatching of the berthing pin causes the actuator to be driven to an open position to forcibly separate the berthing pin of the payload from the latching mechanism.

7. A payload adapter ring adapted to releasably secure a payload to a multiple payload adapter arranged to be carried into outer space by a launch vehicle or be carried in orbit by orbital transfer vehicles for positioning of the payload in a suitable orbit relative to the earth and comprising:

a base
comprising a generally annular hollow box structure that is provided with inwardly sloping jaw lands to assist in guiding a berthing pin to a rest position for securing thereof by the latching mechanism adapted to be securing thereof by a latching means adapted to be secured to the payload adapter ring;

said latching means secured to the base to receive the berthing pin the berthing pin carried by the payload and to releasably latch said berthing pin for securing of the payload for transport of the payload to a desired orbit;

biasing means cooperating with the berthing pins and the latching means to secure the payload in a desired latched position during transport to the desired orbit; and means cooperating with the biasing means and the latching means to simultaneously unlatch the latching means to free the berthing pins and actuate the biasing means whereby the payload previously secured to the payload interface ring is released from the interface ring and the biasing means forcibly separates the payload from the interface ring.

8. A payload adapter ring according to claim 7 wherein:
said base is provided with a plurality of locating pins for positioning and securing of the adapter ring to the carrier ring.

9. A payload adapter ring according to claim 8 wherein:
said base is constructed of advanced organic composites and contains a source of electrical power for the electrical solenoid and the drive means for the latching mechanism.

10. A payload adapter ring according to claim 1 wherein:
at least three latching means are positioned on the base at 120 degree clocked positions to receive three berthing pins of an associated payload.

11. A payload adapter ring according to claim 7 wherein:
at least three latching means are positioned on the base at 120 degree clocked positions to receive three berthing pins of an associated payload.

* * * * *